C. E. HARLAN.
SPARKING INDICATOR.
APPLICATION FILED DEC. 9, 1914.
1,166,366.
Patented Dec. 28, 1915.
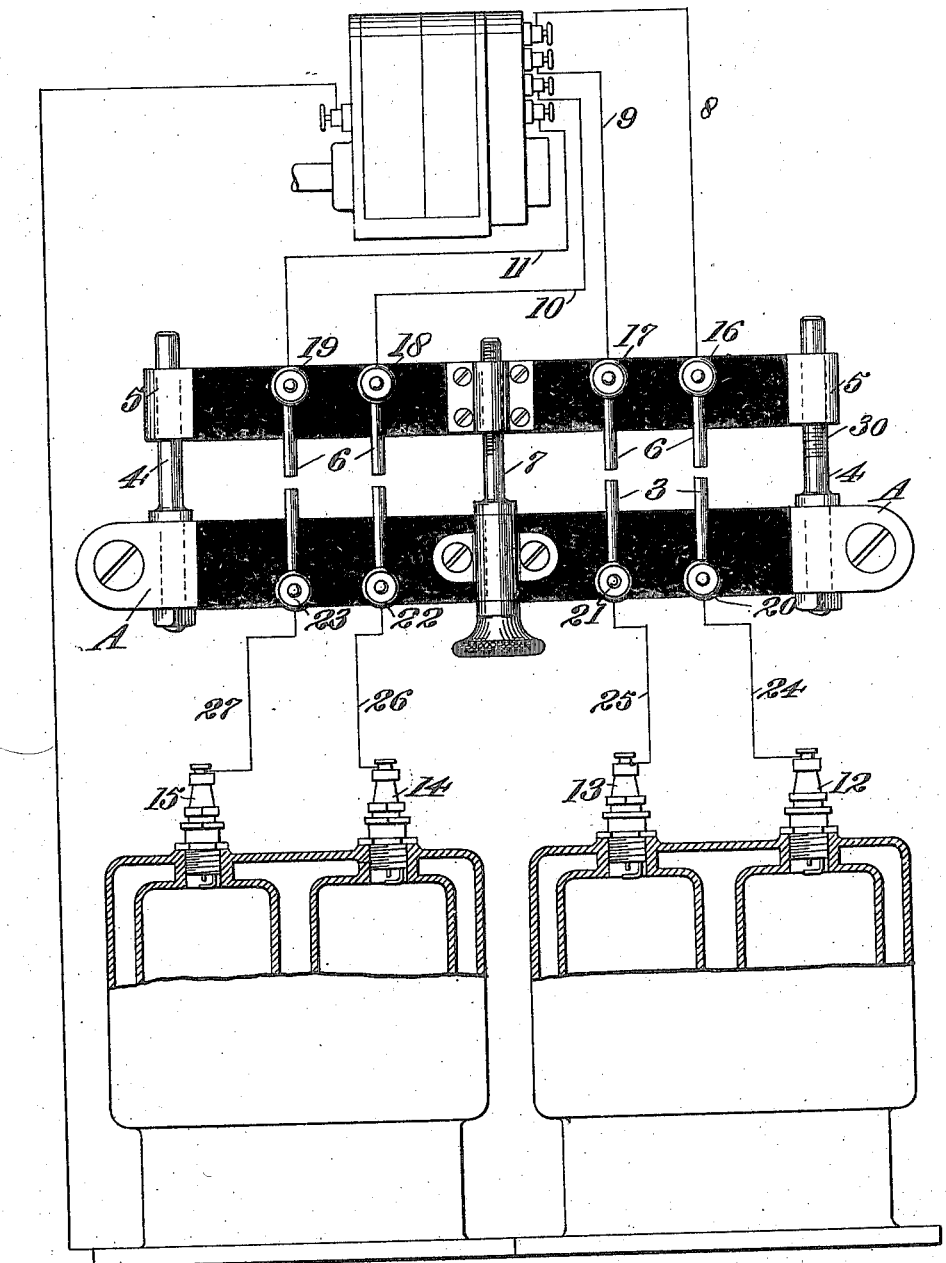
WITNESSES:
Charles Pickles
Thos Lashberg
INVENTOR
Claud E. Harlan,
BY G. H. Strong,
ATTORNEY

UNITED STATES PATENT OFFICE.

CLAUD E. HARLAN, OF WATSONVILLE, CALIFORNIA, ASSIGNOR OF ONE-HALF TO WILLIAM H. AMES, OF WATSONVILLE, CALIFORNIA.

SPARKING INDICATOR.

1,166,366.   Specification of Letters Patent.   Patented Dec. 28, 1915.

Application filed December 9, 1914. Serial No. 876,299.

*To all whom it may concern:*

Be it known that I, CLAUD E. HARLAN, a citizen of the United States, residing at Watsonville, in the county of Santa Cruz and State of California, have invented new and useful Improvements in Sparking Indicators, of which the following is a specification.

This invention relates to a sparking indicator.

It is one of the objects of the present invention to provide a simple portable testing instrument for locating trouble in the ignition system of internal combustion engines, for instance, to determine whether the trouble is caused by a fouled plug, a short circuit in the wiring connections, punctured insulation, magneto trouble, etc.

Further objects and advantages will appear hereinafter.

The invention consists of the parts and the construction and combination of parts as hereinafter more fully described and claimed, having reference to the accompanying drawing, in which the figure is a diagrammatic view illustrating the testing instrument and its connections.

The instrument comprising a stationary holder A, preferably constructed of insulating material, on which is suitably secured a convenient number of sparking points 3. Secured in the outer ends of the holder is a pair of guide rods 4, and slidably mounted on said rods is a movable holder 5, upon which are secured sparking points 6; the number of same conforming to the number carried by the lower holder. The movable holder is also preferably constructed of insulating material, and the position of same, with relation to the main holder, may be adjusted by the screw 7, as shown.

In operation, referring to the drawing which represents a four cylinder unit, the test is made as follows: The secondary wires 8, 9, 10 and 11 of the magneto are first disconnected from their respective engine plugs 12, 13, 14 and 15 and are then connected with terminals 16, 17, 18 and 19 of the upper sparking points. Terminals 20, 21, 22 and 23 of the lower sparking points are then connected by wires 24, 25, 26 and 27 with the engine plugs 12, 13, 14 and 15 which are grounded in the usual manner.

The engine can now be started and is preferably made to run at a comparatively slow speed while the test is being conducted.

The electric current generated by the magneto in order to complete its circuit through the engine plugs will have to jump the gap formed between the sparking points 6 and 3. The current flow can thus be observed at this point. The distance between the sparking points is gradually increased as the test is progressing by turning screw 7 until the gap produced will approximate one-half an inch or more. If the current continues to jump between the several sparking points after a half inch gap has been secured, it will immediately indicate that the magneto and connected wiring, are in good condition or proper working order and that engine troubles, if any, will have to be looked for in some other place.

If the spark becomes extinguished between any one set of terminals 3 and 6 when a one-half inch gap has been secured or previous thereto, it will immediately indicate that something is wrong in this circuit. For instance, leakage may occur in the wiring or connections, or the contact points in the distributer of the magneto may be set too far apart or may be partly corroded, or a short circuit in the connections may be found. The testing instrument will in all cases indicate the defective circuit, making it comparatively easy to locate the actual defect. It can, therefore, be seen that if any connection between the engine plugs and magneto are leaking or are otherwise defective as the distance between the sparking points increases the resistance to the passage of current will become so great that the spark in the defective circuit will immediately be extinguished, as the current in the defective circuit will not be strong enough to jump the gap between the sparking points.

The construction of the testing instrument here shown permits the ignition system of any internal combustion engine to be tested while the engine is running and also eliminates the necessity of removing the engine plugs while the test is being made. The test, although preferably made at low speeds as the spark can then be most easily observed, can be made at various engine speeds; this being an important feature of the present invention as the current output of some generators or magnetos varies greatly with change in speed.

While the specification describes the current jumping a one-half inch gap under favorable conditions, I wish it understood that this distance is not fixed, as one make of magneto may jump a larger gap under the same conditions while another make may only jump a three-eighths or one-quarter inch gap.

The guide rods 4 may be provided with scales or graduations, as indicated at 30, so that the operator making the test will be able to see at a glance the exact distance that the sparking points have been separated, or, in other words, the measurement of the spark gap.

The materials and finish of the several parts of the testing instrument are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A sparking indicator comprising, in combination, a stationary holder, a movable holder adjustably mounted on same, a plurality of sparking points secured on the stationary holder and insulated from same, a plurality of sparking points secured on the movable holder and insulated from same, means for connecting the sparking points on the movable holder with the secondary wires of a magneto, and means for connecting the sparking points on the stationary holder with the spark plugs on an internal combustion engine.

2. A sparking indicator comprising, in combination, a stationary holder, a pair of guide rods mounted on said holder, a bar slidably mounted on said guide rods, a screw connecting said bar with the stationary holder, said screw adapted to adjust the position of the bar with relation to the holder, a plurality of sparking points secured on the holder and insulated from same, and a plurality of sparking points secured on the bar and insulated from same.

3. A sparking indicator comprising, in combination, a stationary holder, a pair of guide rods mounted on said holder, a bar slidably mounted on said guide rods, a screw connecting said bar with the stationary holder, said screw adapted to adjust the position of the bar with relation to the holder, a plurality of sparking points secured on the holder and insulated from same, a plurality of sparking points secured on the bar and insulated from same, means for connecting said sparking points with secondary wires of a magneto, and means for connecting the sparking points on the holder with the spark plugs on an internal combustion engine.

In testimony whereof I have hereunto set my hand in the presence of two subscribing witnesses.

CLAUD E. HARLAN.

Witnesses:
ELLEN WHITE,
D. F. MAHER.

Copies of this patent may be obtained for five cents each, by addressing the "Commissioner of Patents, Washington, D. C."